United States Patent [19]
Hoffman et al.

[11] Patent Number: 5,697,692
[45] Date of Patent: Dec. 16, 1997

[54] ARRANGEMENT FOR ADJUSTING THE REFLECTOR INCLINATION ANGLE OF FRONT HEADLIGHTS OF A MOTOR VEHICLE

[75] Inventors: Harry Hoffman, Sindelfingen; Eberhard Baur, Rottenburg; Reiner Jocher, Aidlingen, all of Germany

[73] Assignee: Mercedes-Benz AG, Germany

[21] Appl. No.: 694,336

[22] Filed: Aug. 8, 1996

[30] Foreign Application Priority Data

Aug. 18, 1995 [DE] Germany ............. 19530444.6-33

[51] Int. Cl.⁶ .................................................. B60Q 1/06
[52] U.S. Cl. ......................................................... 362/66
[58] Field of Search .............................................. 362/66

[56] References Cited

U.S. PATENT DOCUMENTS 5,260,857 11/1993 Lukkarinen et al. .
5,573,326 11/1996 Iijima ........................................ 362/66

FOREIGN PATENT DOCUMENTS 2 253 047 A   2/1992  Germany .
41 04 297 A1  8/1992  Germany .

*Primary Examiner*—Carroll B. Dority
*Attorney, Agent, or Firm*—Evenson, McKeown, Edwards & Lenahan P.L.L.C.

[57] ABSTRACT

An arrangement for adjusting the reflector inclination angle of front headlights of a motor vehicle which contains an adjusting screw for the reflector provided with a teeth and a guide for a Phillips screwdriver which is used as an adjustment tool transversely with respect to the screw axis. In order to, on the one hand, achieve a simple mounting which can be automated and is secured with respect to a loss and to achieve, on the other hand, in a simple manner a secure guide of the Phillips screwdriver without any jamming, for adjusting the reflector, the toothing is molded onto the adjusting screw. The adjusting screw, on the head-side section, together with the molded-on teeth must have a smaller diameter than that of the shell passage provided for the adjusting screw. Furthermore, in order to axially fix the adjusting screw, detent elements must be provided which are molded to the shell for locking engagement with the screw. The guide is formed by a supporting web shaped out of the shell on the exterior side and with a distance to the adjusting screw. The supporting web has an insertion opening for the Phillips screwdriver which is oriented transversely to the screw axis and is situated at the axial side of the toothing.

14 Claims, 1 Drawing Sheet

ARRANGEMENT FOR ADJUSTING THE REFLECTOR INCLINATION ANGLE OF FRONT HEADLIGHTS OF A MOTOR VEHICLE

BACKGROUND AND SUMMARY OF THE INVENTION

This invention relates to an arrangement for adjusting the reflector inclination angle of front headlights of a motor vehicle.

An arrangement for adjusting a headlight reflector inclination angle is known from U.S. Pat. No. 5,260,857. On the exterior side, the headlight housing has a wall section which forms a supporting web arranged at a distance from the adjusting screw and has a tool channel with an insertion opening for a long Phillips screw driver which extends perpendicularly and transversely to the adjusting screw axis, for adjusting the headlight reflector. The screwdriver is supported and guided by the tool channel. The tool channel is situated on the axial side of gear teeth which face the shell and is arranged on the adjusting screw head so that the diagonal flanks of the screwdriver tip can engage in a meshing manner with the gear teeth. The adjusting screw, which consists of steel, is rotatably disposed and axially fixed on the shell. A zinc alloy casting, which comprises a plate with the gear teeth and a spherical section adjoining it in the direction of the housing, is pressed onto the screwhead. From the direction of the exterior side of the shell, the screw is fitted through the shell and is screwed by means of its threaded section into an internal thread of a connection part of the reflector.

Furthermore, in German Patent Document DE-OS 41 04 297, an adjusting screw is shown whose head consists of a plastic gear wheel and whose shaft is formed of a metallic adjusting pin. The gear wheel is clampingly slid onto an end-side section of the adjusting pin provided with an axial and circumferential knurl. For mounting the headlight shell, the adjusting screw is fastened on it by way of a clamping ring equipped with a seal. While the adjusting screw is fitted from the rear, thus on the engine compartment side, through the passage provided for this purpose in the shell, the clamping ring, together with the seal, is fitted from the interior of the shell onto the shaft of the adjusting screw and is fastened in the area of the passage on the shell, whereby the adjusting screw is axially fastened. For the construction and the fastening of the adjusting screw, three components are therefore required, specifically the gear wheel, the clamping ring and the adjusting pin, in which case the adjusting pin must be especially treated beforehand for forming the knurling for the gear wheel to be held on it so that it is protected from falling off. In this case, the large number of parts as well as the embossing of a knurling and their assembly represent a design of the adjusting screw which requires high constructional expenditures.

Furthermore, the mounting of the adjusting screw must take place from two sides, which makes an automation of the mounting significantly more difficult if not impossible. Also, on the exterior side of the headlight shell, a metallic half shell is provided for guiding the Phillips screwdriver, which half shell extends conically toward the toothing of the gear wheel. Apart from the fact that here another component is used for designing the arrangement which must be mounted separately, the shell must be constructed with a recess on the exterior side to secure the half shell, so the manufacturing of the shell requires higher expenditures. In addition, the Phillips screwdriver, which is inserted between the half shell and the gear wheel by means of its tip, as a result of the direct contact of its flanks on the half shell, on the one hand, and the toothing of the gear wheel, on the other hand, may jam on the adjusting screw which will occur particularly if the screwdriver has a chipping effect on the half shell. If the screwdriver is violently pulled out of its jammed position, the adjusting screw may easily be rotated when the reflector position is adjusted so that the reflector will be out of adjustment again. In the case of only a slight contact on the half shell as well as on the gear wheel for preventing the screwdriver from jamming, the lateral hold in the guide is not sufficient in order to be able to completely prevent the screwdriver from slipping-out so that an implementation of the adjustment without interruptions is not ensured.

It is an object of the invention to further develop an arrangement of the above-mentioned type such that, on the one hand, a simple mounting of the adjusting screw is achieved which can be automated and is secured with respect to a loss, but, on the other hand, a hold-providing guiding of the Phillips screwdriver is achieved in a simple manner which cannot jam, in order to adjust the reflector.

According to the invention, this and other objects have been achieved by providing an arrangement for adjusting an inclination angle of a reflector of a headlight of a motor vehicle, comprising an adjusting screw which is arranged and configured to extend along an axis through a passage in a headlight shell to operatively connect with a headlight reflector located on an interior of said headlight shell, said adjusting screw having a head-side section which extends through said passage to an exterior of said headlight shell, said adjusting screw having a conical toothed portion and a conical portion which each extend obliquely with respect to said axis and which face each other to form an essentially V-shaped groove, said toothed portion being configured to mesh with a tip of a screwdriver.

According to certain preferred embodiments, an arrangement for adjusting an inclination angle of a reflector of a headlight of a motor vehicle is provided which comprises an adjusting screw which is arranged and configured to extend along an axis through a passage in a headlight shell to operatively connect with a headlight reflector located on an interior of said headlight shell, said adjusting screw having a head-side section which extends through said passage to an exterior of said headlight shell, said adjusting screw having a conical toothed portion which extends obliquely with respect to said axis, said toothed portion being configured to mesh with a tip of a screwdriver, said headlight shell comprising a supporting web which is arranged at a radial distance from said toothed portion, said supporting web comprising an insertion opening for said screwdriver.

According to other certain preferred embodiments, an arrangement for adjusting an inclination angle of a reflector of a headlight of a motor vehicle is provided which comprises an adjusting screw having a shaft-side section which projects into a shell of the headlight through a shell passage, said adjusting screw being operatively connected to adjust the reflector, said adjusting screw being rotatably disposed on the shell, said adjusting screw being axially fixed on the shell by a fastening device, and said adjusting screw having a head-side section which projects out of the shell, said head-side section having a toothing which is arranged concentrically with respect to an axis of the adjusting screw and which is constructed such that the tip of a Phillips screwdriver can engage in this toothing in a meshing manner, said toothing being configured for engagement by said screwdriver at an angle transverse to the screw axis, and a guide for the Phillips screwdriver which is arranged on the shell, which is aligned with the toothing, and which extends transversely to the screw axis, said guide being formed by a supporting web formed on the exterior side of the shell, said supporting web being arranged at a distance from the adjusting screw, said guide having an insertion opening for the Phillips screwdriver oriented transversely to the screw axis and situated at an axial position of the toothing, wherein the head-side section of the adjusting screw together with the toothing has a smaller diameter than the diameter of the shell passage which is provided for the adjusting screw, and the fastening devices are detent elements which are provided on the outside on the shell for locking the screw.

Because of the integration of the teeth into the formed-out portion of the adjusting screw and the inclusion of the fastening device for the adjusting screw and of the guide for the Phillips screwdriver into the formed-out portion of the headlight shell, the number of the components for adjusting the reflector is reduced to one part, specifically the adjusting screw itself, in which case the construction of the arrangement is simultaneously simplified. As a result of the one-part construction of the adjusting screw, whose diameter is smaller than that of the passage provided for it in the shell, the mounting can take place in a simple manner from one direction—the shell interior—in that the adjusting screw is fitted at low expenditures through the passage, in which case detent elements which are molded to the shell and are used as fastening devices engage on the adjusting screw and fix it axially. Due to the considerably simplified mounting, during which only one component must be handled in a single mounting direction, the cost of the mounting is also reduced. Likewise, the mounting can be automated without special expenditures. Furthermore, because of the one-part construction of the adjusting screw, a high-expenditure and cost-intensive assembly is not required. Likewise, the manufacturing of the original component unit is simplified and connected manufacturing costs are reduced.

Furthermore, the conventional metallic guide component and the construction of a receiving device required for it on the shell are eliminated because of the forming-out of the shell by means of a supporting web so that here also the manufacturing and mounting expenditures as well as the connected costs are eliminated which the separate guide component and the receiving device require. By arranging the opening in the supporting web spaced away from the teeth, the Phillips screwdriver is guided in a surrounding manner with a secure lateral hold, in which case the screwdriver is supported on two points—the supporting web and the toothing—and the screwdriver is prevented from slipping-off. Because there is no contact of the guide part on the tip of the screwdriver and therefore no displacement of the guide out of the engagement area, the screwdriver does not jam on the teeth and because there is no force which presses the cutting flanks of the screwdriver tip against the teeth and which is applied by the conventional guide part, an abrasion of the teeth is avoided, whereby the useful life of the arrangement is increased.

These and other objects, features and advantages of the present invention will become more readily apparent from the following detailed description when taken in conjunction with the accompanying drawings.

DETAILED DESCRIPTION OF THE DRAWINGS

Figure 1:
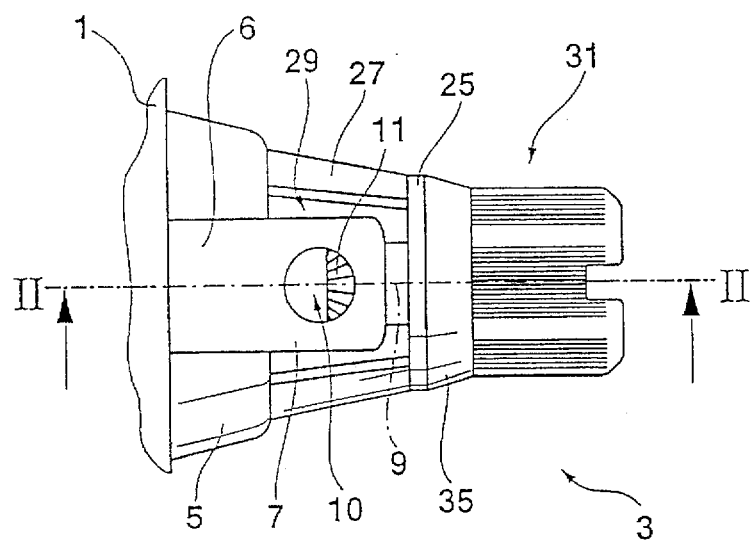
FIG. 1 is a top view of a section of the arrangement according to a preferred embodiment of the invention.
Figure 2:
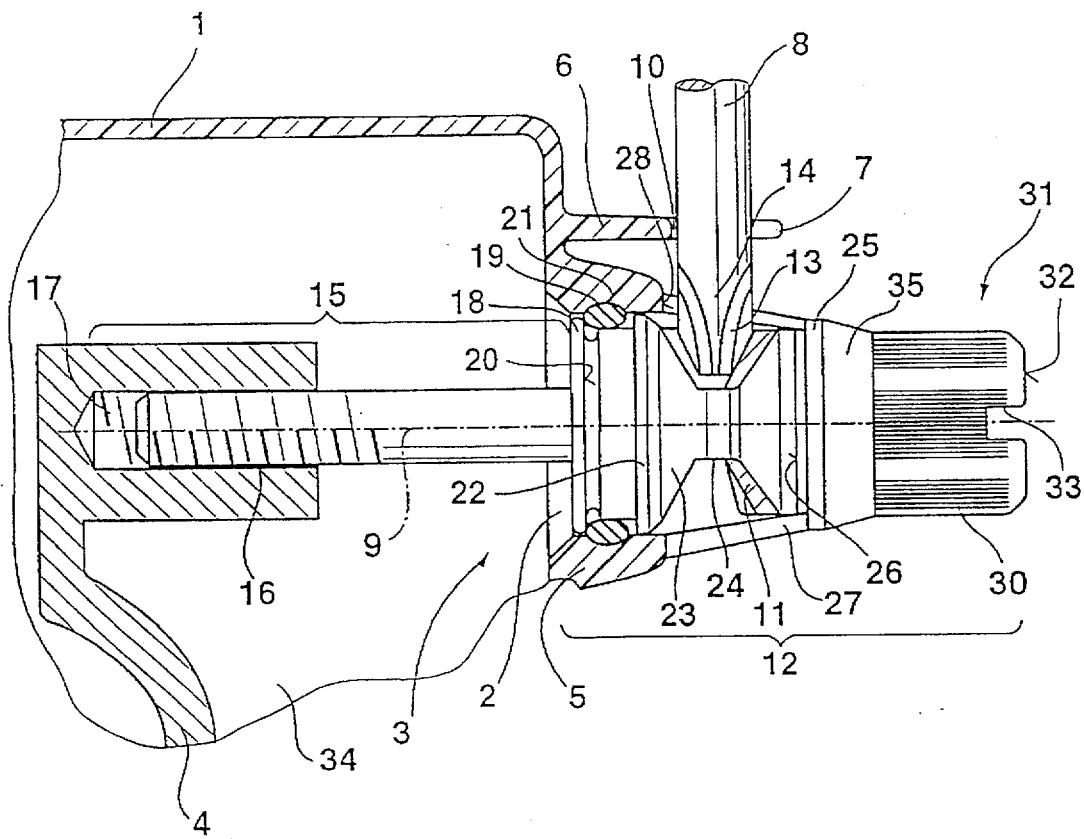
FIG. 2 is a lateral longitudinal sectional view along Line II—II of the arrangement of FIG. 1.

FIG. 1 shows a section of a headlight shell or housing 1 made of plastic, particularly of a front headlight shell of a motor vehicle which has a passage 2 for an adjusting screw 3 for adjusting the inclination angle of a headlight reflector 4. The passage 2 is aligned such that the adjusting screw 3 is in a horizontal position. The passage 2 is surrounded by a truncated-cone-shaped section 5 of the shell 1 which projects from it toward the outside, as shown in FIG. 2. Above the section 5, a bracket 6 is molded to the shell 1, from which bracket 6 a supporting web 7 for a Phillips screwdriver 9 projects in the horizontal direction. The supporting web 7 which is vertically spaced away from the adjusting screw 3 situated in the installed position has an insertion opening 10 which is aligned horizontally in the transverse direction with respect to the screw axis 9, which insertion opening 10 is situated at the upper axial side of a steep-angle taper toothing 11, whereby the supporting web 7 forms the guide for the screwdriver 8.

The steep angle taper toothing 11 is injection-molded in a surrounding and material-identical manner coaxially with respect to the screw axis 9 on the circumference of the head-side section 12 of the plastic adjusting screw 3 which projects out of the shell 1, whereby the toothing 11 and the adjusting screw 3 form a single unitary component. The toothing 11 is situated slightly axially offset to the outside relative to the center of the insertion opening 10 so that the flanks 13 of the screwdriver tip 14 can mesh with the toothing 11 to turn the adjusting screw 3. The tip 14 therefore forms a countertoothing with respect to the toothing 11.

As illustrated in FIG. 2, an external thread 16 of a shaft-side section 15 of projecting into the shell 1 engages a nut thread which is mounted on the reflector 4. The adjusting screw 3 has a collar 18 which, in the installed position, is situated in the area of the passage 2 and against which a ring-shaped elastomer seal 19 rests which is fitted onto the adjusting screw 3. On the side 20 facing away from the reflector, the collar 18 is supported on a ring-shaped recess 21 which projects from the wall of the passage 2 toward the inside.

In the further outwardly directed course of the adjusting screw 3, it has another collar 22 at an axial distance, which is slightly larger than the thickness of the seal 19, so that the ring seal 19 is held in an axially secure manner toward both directions on the adjusting screw 3. The seal 19 not only prevents moisture or spraying water from reaching the headlight shell but also reduces the freedom of play of the adjusting screw 3. Furthermore, the seal 19 provides the adjusting screw 3 with a certain frictional restriction in order to prevent an unintentional rotation of the adjusting screw 3 and thus an undesired misadjustment of the reflector 4.

Adjoining the collar 22 toward the outside, the adjusting screw is constructed in a conically tapering manner, this cone 23 being designed corresponding to the conical course of the toothing 11 which is situated opposite it in a mirror-inverted manner. The ring groove 24, which is formed in this case between the cone 23 and the toothing 11, on the top side, represents the engaging space for the screwdriver 8. The circumferential surface of the reduced shaft of the adjusting screw 3 formed by an essentially V-shaped ring groove 24, which is bounded by the cone 23 which forms an axial support for the screwdriver tip 14 so that the axial component of the driving-apart moment of force exercised by the toothing 11 on the screwdriver 8 is absorbed. However, this takes place only when the tip rests against the cone 23. Simultaneously, the supporting web 7 axially supports the screwdriver 8 against the moment of force. If the cone 23 is situated axially outside the engagement of the screwdriver 8, the supporting web 7 alone can axially take over the absorption of the moment of force, in which case the insertion opening 10 is dimensioned with respect to its diameter such that it surrounds the shaft of the screwdriver 8 only with a small tolerance.

The toothing 11 is adjoined on the side facing away from the cone toward the outside by a third collar (locking collar) 25 on which, on its side 26 facing the toothing 11, several bending-elastic detent webs 27 are supported which are used as fastening devices for the adjusting screw 3 and which in a constructionally and functionally favorable manner are molded onto the face 28 of the section 5 of the shell 1 in a concentrically surrounding fashion and extend linearly but conically tapering toward the screw axis 9. Thus, the detent webs 27 and the shell 1 form, in an easily manufacturable manner, a uniform component made of plastic. The detent webs 27 are arranged on the passage 2 in such a manner that, on the top side, a clearance 29 is recessed from this passage 2 through which the Phillips screwdriver 8 can engage with the adjusting screw 3.

The locking collar 25 tapers conically toward the outside and is adjoined by a cylindrical end section 30 of the screwhead 31. The end section 30 is knurled on its circumference and has a hexagonal exterior shape. Furthermore, a slot 33 which extends transversely with respect to the screw axis 9 is constructed on its face 32. In addition, the screwhead 31 has a hexagonal recess and, at its base, a cross slot. As a result, the adjusting screw 3 can optionally be rotated by using a coin, a fork wrench, a wrench for socket head cap screws, a short Phillips screwdriver which can be applied axially or a long Phillips screwdriver which can be applied radially and can therefore be operated in a universal manner or directly by manual manipulation.

The material selection for the adjusting screw 3, the toothing 11 and the detent webs 27 may be any corrosion-resistant material. However, with respect to a reduction of the weight of the arrangement, particularly of the overall weight of the motor vehicle, it is advantageous to use light construction materials, such as plastic, for this purpose. For low-expenditure manufacturing, it is advantageous to design the elements of the arrangement uniformly of one material—in this case of plastic; specifically because with respect to the detent webs 27, the headlight shell 1 is also made of this material.

For assembly, the elastomer seal 19 is first applied between the collars 18 and 22 to the adjusting screw 3. Then the adjusting screw 3 is fitted from the shell interior 34 through the passage 2, in which case the detent webs 27 are pressed by the conical flank 35 of the locking collar 25 radially toward the outside until the collar 18, by way of the elastomer seal 19, comes to rest on the recess 21. On the side 26 of the locking collar 25 facing the toothing 11, the detent webs 27 then lock into the circumference of the adjusting screw 3, whereby the adjusting screw 3 is axially fixed because of the support on both sides. The adjusting screw 3 is already premounted on the reflector 4 and is locked as a constructional unit. Finally, by way of the toothing 11, the adjusting screw 3 is operated from above by rotating the Phillips screwdriver 8, whereby the reflector 4 is adjusted. The reflector 4 is therefore adjusted by using only one component at a right angle from above. The use of a screwdriver 8 of a conventional length from above is a significant advantage particularly in the case of narrow spaces. Such a screwdriver 8 is easily available since it is usually part of the vehicle tool kit.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An arrangement for adjusting an inclination angle of a reflector of a headlight of a motor vehicle, comprising:

an adjusting screw having a shaft-side section which projects into a shell of the headlight through a shell passage, said adjusting screw being operatively connected to adjust the reflector, said adjusting screw being rotatably disposed on the shell, said adjusting screw being axially fixed on the shell by a fastening device, and said adjusting screw having a head-side section which projects out of the shell, said head-side section having a toothing which is arranged concentrically with respect to an axis of the adjusting screw and which is constructed such that the tip of a Phillips screwdriver can engage in this toothing in a meshing manner, said toothing being configured for engagement by said screwdriver at an angle transverse to the screw axis, and a guide for the Phillips screwdriver which is arranged on the shell, which is aligned with the toothing, and which extends transversely to the screw axis, said guide being formed by a supporting web formed on the exterior side of the shell, said supporting web being arranged at a distance from the adjusting screw, said guide having an insertion opening for the Phillips screwdriver oriented transversely to the screw axis and situated at an axial position of the toothing, wherein the head-side section of the adjusting screw together with the toothing has a smaller diameter than the diameter of the shell passage which is provided for the adjusting screw, and the fastening device comprises at least one detent element provided on the outside on the shell for locking the screw.

2. An arrangement according to claim 1, wherein the shaft-side section and the head-side section of the adjusting screw including the toothing comprise a unitary component of a corrosion-resistant material.

3. An arrangement according to claim 2, wherein the corrosion-resistant material is a plastic material.

4. An arrangement according to claim 1, wherein the head-side section of the adjusting screw has a shaft reduction in the area of the toothing, said shaft reduction comprising a circumferential surface situated opposite the toothing which forms an axial support for the tip of the screwdriver.

5. An arrangement according to claim 1, wherein said adjusting screw further comprises two collars, said headlight shell comprises a recess, and a seal is disposed between said two collars and is seated in said recess.

6. An arrangement for adjusting an inclination angle of a reflector of a headlight of a motor vehicle, comprising:

an adjusting screw which is arranged and configured to extend along an axis through a passage in a headlight shell, said adjusting screw including a shaft-side section operatively connected with a headlight reflector located on an interior of said headlight shell, said adjusting screw extending through said passage to an exterior of said headlight shell, said adjusting screw having a head-side section including a conical toothed portion which extends obliquely with respect to said axis, said toothed portion being configured to mesh with a tip of a screwdriver, wherein said headlight shell is provided with a plurality of detent webs, said adjusting screw is provided with a locking collar, and said detent webs engage said locking collar in an assembled position.

7. An arrangement according to claim 6, wherein said adjusting screw further comprises a conical portion arranged axially facing said toothed portion, said conical portion forming a support surface for said screwdriver tip.

8. An arrangement according to claim 6, wherein the shaft-side section and the head-side section of the adjusting screw including the toothed portion comprise a single unitary component.

9. An arrangement for adjusting an inclination angle of a reflector of a headlight of a motor vehicle, comprising:

an adjusting screw which is arranged and configured to extend along an axis through a passage in a headlight shell, said adjusting screw including a shaft-side section operatively connected with a headlight reflector located on an interior of said headlight shell, said adjusting screw extending through said passage to an exterior of said headlight shell, said adjusting screw having a head-side section including a conical toothed portion which extends obliquely with respect to said axis, said toothed portion being configured to mesh with a tip of a screwdriver, wherein said adjusting screw further comprises two collars, said headlight shell comprises a recess, and a seal is disposed between said two collars and is seated in said recess.

10. An arrangement according to claim 6, wherein said head-side section has a diameter which at a greatest extent is less than or equal to a diameter of said passage in the headlight shell.

11. An arrangement according to claim 10, wherein said headlight shell is provided with a plurality of detent webs, said adjusting screw is provided with a locking collar, and said detent webs engage said locking collar in an assembled position.

12. An arrangement according to claim 10, wherein the shaft-side section and the head-side section of the adjusting screw including the toothed portion and the conical portion comprise a single unitary component.

13. An arrangement according to claim 8, wherein said adjusting screw further comprises two collars, said headlight shell comprises a recess and a seal is disposed between said two collars and is seated in said recess.

14. An arrangement according to claim 11, wherein said headlight shell further comprises a supporting web which is arranged at a radial distance from said toothed portion, said supporting web comprising an insertion opening for said screwdriver.

* * * * *